(12) United States Patent
Yamasaki

(10) Patent No.: US 12,325,352 B2
(45) Date of Patent: Jun. 10, 2025

(54) VEHICLE POSTURE CALCULATION DEVICE AND HEADLIGHT OPTICAL-AXIS CONTROL APPARATUS

(71) Applicant: SUBARU CORPORATION, Tokyo (JP)

(72) Inventor: Kentarou Yamasaki, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 251 days.

(21) Appl. No.: 17/884,962

(22) Filed: Aug. 10, 2022

(65) Prior Publication Data

US 2023/0065315 A1    Mar. 2, 2023

(30) Foreign Application Priority Data

Sep. 1, 2021  (JP) .................. 2021-142662

(51) Int. Cl.
*B60Q 1/10*   (2006.01)
*G01S 19/13*  (2010.01)

(52) U.S. Cl.
CPC .............. *B60Q 1/10* (2013.01); *G01S 19/13* (2013.01); *B60Q 2300/324* (2013.01)

(58) Field of Classification Search
CPC ...... B60Q 1/10; B60Q 2300/324; G01S 19/13
USPC ......................................... 701/454
See application file for complete search history.

(56) References Cited

U.S. PATENT DOCUMENTS

| | | | |
|---|---|---|---|
| 2012/0002430 A1 | 1/2012 | Yamazaki et al. | |
| 2013/0300609 A1* | 11/2013 | Watanabe | G01S 15/102 |
| | | | 342/453 |
| 2015/0332098 A1* | 11/2015 | Wang | G06T 7/73 |
| | | | 382/103 |

(Continued)

FOREIGN PATENT DOCUMENTS

| | | | |
|---|---|---|---|
| DE | 102019129929 A1 * | 5/2021 | |
| JP | 08-192673 A | 7/1996 | |

(Continued)

OTHER PUBLICATIONS

Office Action issued in the corresponding Japanese Patent Application No. 2021-142662 on Apr. 25, 2025, w/ English Translation.

*Primary Examiner* — Hunter B Lonsberry
*Assistant Examiner* — Helen Li
(74) *Attorney, Agent, or Firm* — Rimon P.C.

(57) ABSTRACT

A vehicle posture calculation device includes an electronic control unit for a vehicle. The electronic control unit acquires a position and orientation of the vehicle from information of a global positioning system receiver. The electronic control unit extracts, as at least one feature point, a position of a landmark in an image acquired with a camera. The electronic control unit acquires at least one calculated reference point and calculate an inclination angle of the vehicle. The at least one calculated reference point is acquired by calculating a position of the landmark to be captured in the image with the camera. The position of the landmark is calculated from a three-dimensional map and the position and the orientation of the vehicle that are acquired. The inclination angle is calculated from displacement between the at least one feature point and the at least one calculated reference point.

16 Claims, 2 Drawing Sheets

(56) References Cited

U.S. PATENT DOCUMENTS

| | | | | |
|---|---|---|---|---|
| 2016/0037032 A1* | 2/2016 | Iwama | .................. | H04N 23/90 |
| | | | | 348/148 |
| 2017/0039433 A1* | 2/2017 | Kawano | ................ | H04N 23/80 |
| 2017/0225609 A1* | 8/2017 | Tsuzuki | ................ | F21S 41/657 |
| 2018/0201150 A1* | 7/2018 | Kubo | ...................... | B60L 58/25 |
| 2018/0300900 A1* | 10/2018 | Wakai | ....................... | G06T 7/85 |
| 2020/0271449 A1* | 8/2020 | Sakano | ................. | H04N 23/90 |
| 2021/0179138 A1* | 6/2021 | Terazawa | ........... | G01C 21/3476 |
| 2023/0041499 A1* | 2/2023 | Uestuenel | ........... | B60W 40/072 |

FOREIGN PATENT DOCUMENTS

| | | | | |
|---|---|---|---|---|
| JP | 2021-062866 A | 4/2021 | | |
| JP | 2021-062868 A | 4/2021 | | |
| WO | WO-2016013419 A1 * | 1/2016 | ............. | B60Q 1/115 |
| WO | 2020/115945 A1 | 6/2020 | | |

\* cited by examiner

VEHICLE POSTURE CALCULATION DEVICE AND HEADLIGHT OPTICAL-AXIS CONTROL APPARATUS

CROSS-REFERENCE TO RELATED APPLICATIONS

The present application claims priority from Japanese Patent Application No. 2021-142662 filed on Sep. 1, 2021, the entire contents of which are hereby incorporated by reference.

BACKGROUND

The disclosure relates to a vehicle posture calculation device and a headlight optical-axis control apparatus, the vehicle posture calculation device detecting the inclination and the like of a vehicle.

The optical axis of a headlight is to be directed within a range stipulated in the regulation. The range is set not to emit light from the headlight to the driver's seat or the like of a vehicle coming in the opposite direction. The optical axis is sometimes displaced in installing the headlight from a predetermined position due to tolerances of the headlight and the body of a vehicle and variation in the posture of the vehicle and thus is adjusted on a per-vehicle basis. The vehicle thus includes a mechanism for adjusting the optical axis with a screw or the like. However, if a suspension acts due to, for example, imbalance in load in the vehicle or a centrifugal force, the vehicle is inclined with respect to the road surface. In such a case, even if the optical axis lies within the range stipulated in the regulation, the light from the headlight might be emitted to the driver's seat or the like of the vehicle coming in the opposite direction. In recent years, the headlight has emitted stronger light. Even if the optical axis is not directed to the driver's seat or the like, the optical axis just near the driver of the vehicle coming in the opposite direction is likely to cause the driver to dazzle.

SUMMARY

An aspect of the disclosure provides a vehicle posture calculation device for a vehicle. The vehicle posture calculation device includes an electronic control unit for the vehicle. The electronic control unit is configured to acquire a position and orientation of the vehicle from information of a global positioning system receiver. The electronic control unit is configured to extract, as at least one feature point, a position of a landmark in an image acquired with a camera. The electronic control unit is configured to acquire at least one calculated reference point and calculate an inclination angle of the vehicle. The at least one calculated reference point is acquired by calculating a position of the landmark to be captured in the image with the camera. The position of the landmark is calculated from a three-dimensional map and the position and the orientation of the vehicle that are acquired. The inclination angle is calculated from displacement between the at least one feature point and the at least one calculated reference point.

An aspect of the disclosure provides a headlight optical-axis control apparatus. The headlight optical-axis control apparatus includes the vehicle posture calculation device and an optical-axis adjustment device configured to adjust an optical axis of a headlight of the vehicle. The optical-axis adjustment device is configured to, upon receiving the vehicle inclination angle with the road surface, direct the optical axis with respect to the road surface within a predetermined range by controlling the optical axis of the headlight.

BRIEF DESCRIPTION OF THE DRAWINGS

The accompanying drawings are included to provide a further understanding of the disclosure and are incorporated in and constitute a part of this specification. The drawings illustrate an example embodiment and, together with the specification, serve to describe the principles of the disclosure.

DETAILED DESCRIPTION

The optical axis of a headlight has been automatically adjusted based on inclination of a detected posture of a vehicle. The posture of the vehicle is detected typically by using vehicle height sensors as described in Japanese Unexamined Patent Application Publication (JP-A) No. H8-192673; however, the sensors are installed on the front and rear portions of the vehicle and thus involve cost. In addition, posture detection with an acceleration sensor as described in JP-A No. 2021-62866 has been increasingly performed. However, the value of the sensor is temporarily stored when the ignition is switched off, and the storing may hinder an accurate inclination value from being output if a posture or a road surface inclination is changed due to transportation by a trailer or a ship in a period from the switching off of the ignition to the switching on.

It is desirable to provide a vehicle posture calculation device configured to calculate a vehicle inclination angle from information of a GPS receiver and an image acquired with a camera.

The accompanying drawings are included to provide a further understanding of the disclosure and are incorporated in and constitute a part of this specification. The drawings illustrate example embodiments and, together with the specification, serve to describe the principles of the disclosure.

Figure 1:
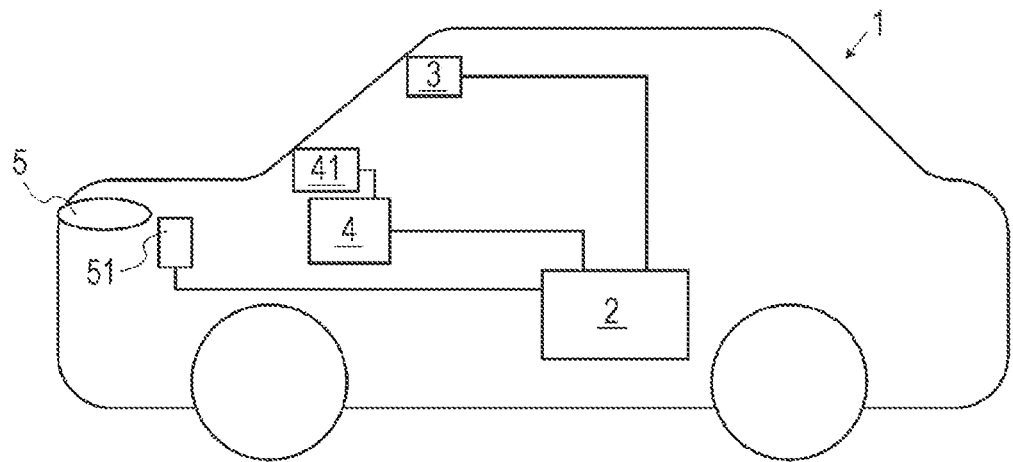
FIG. 1 is a system configuration view illustrating an embodiment of the disclosure.

A vehicle 1 in the embodiment of the disclosure includes an electronic control unit (ECU) 2 serving as a vehicle posture calculation device. As illustrated in FIG. 1, the ECU 2 is coupled to a camera 3 equipped with the vehicle 1, a car navigation system 4, and an optical-axis adjustment device 51 for headlights 5. As the camera 3, a camera for an event data recorder or an advanced safety equipment is utilized. In addition, an existing car navigation system is utilized as the car navigation system 4. In the disclosure, the vehicle 1 may mean a vehicle body which includes at least the camera 3 and the headlights 5 of the vehicle 1 and which includes no wheels of the vehicle 1.

The ECU 2 acquires, from the car navigation system 4, information regarding the latitude, the longitude, and the orientation of the vehicle 1 and a 3D map of an area around the vehicle 1. The car navigation system 4 receives the information regarding the latitude and the longitude of the vehicle 1 from a GPS receiver 41 and then calculates the orientation of the vehicle 1 from movement data based on the latitude and the longitude. The 3D map has data regarding the 3D shape of a landmark such as a building or a traffic sign and the altitude and the inclination of a road.

Figure 2:
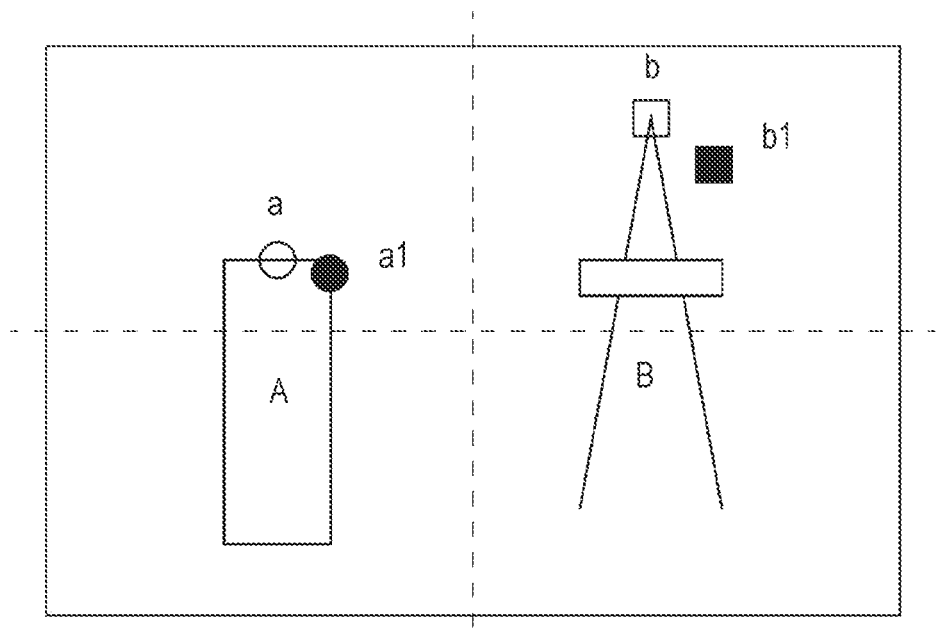
FIG. 2 is a view for explaining feature points and calculated reference points in the embodiment.

The ECU 2 also acquires an image from the camera 3. The ECU 2 selects two landmarks from the image and extracts, from each landmark, the coordinates of the position of a feature point in the image. FIG. 2 illustrates the coordinates of feature points a and b respectively extracted from two landmarks A and B. For the landmark A, the coordinates of the center of the uppermost portion are extracted as the coordinates of the feature point a. For the landmark B, the coordinates of the uppermost point are extracted as the coordinates of the feature point b. The coordinates are coordinates in the image. Coordinate axes on the coordinate plane of a screen are depicted in FIG. 2 by using dotted lines.

The ECU 2 also acquires a calculated reference point by calculating a position of the landmark to be captured in the image. The position of the landmark is calculated from the data of the 3D map and the latitude, the longitude, and the orientation of the vehicle 1. The 3D map has data regarding the 3D shape of a landmark, such as a building or a traffic sign, and the altitude of a road, and the road surface inclination. In addition, the data regarding the road surface inclination in the 3D map is also used to set, as the calculated reference point, the position of the landmark to be captured with a virtual camera for the 3D map corresponding to the camera 3 that is located when the vehicle 1 is parallel to the road. A point a1 in FIG. 2 is a calculated reference point acquired by calculating the coordinates of the center of the uppermost portion of the landmark A. A point b1 is a calculated reference point acquired by calculating the coordinates of the uppermost portion of the landmark B. The 3D map may include at least one of a three-dimensional cloud point data, the area or an RGB-D data of the area.

The bending or the like of the suspension causes the vehicle 1 to be inclined with respect to the road surface, and thus the inclination causes the coordinates of each of the points a and b in the image to be displaced from a corresponding one of the calculated reference points a1 and b1. From the displacement, of the feature points in the image captured with the camera 3, from the respective calculated reference points calculated from the 3D data, the vehicle inclination angle with the road surface that is the inclination of the vehicle 1 made with the road surface may be calculated.

Figure 3:
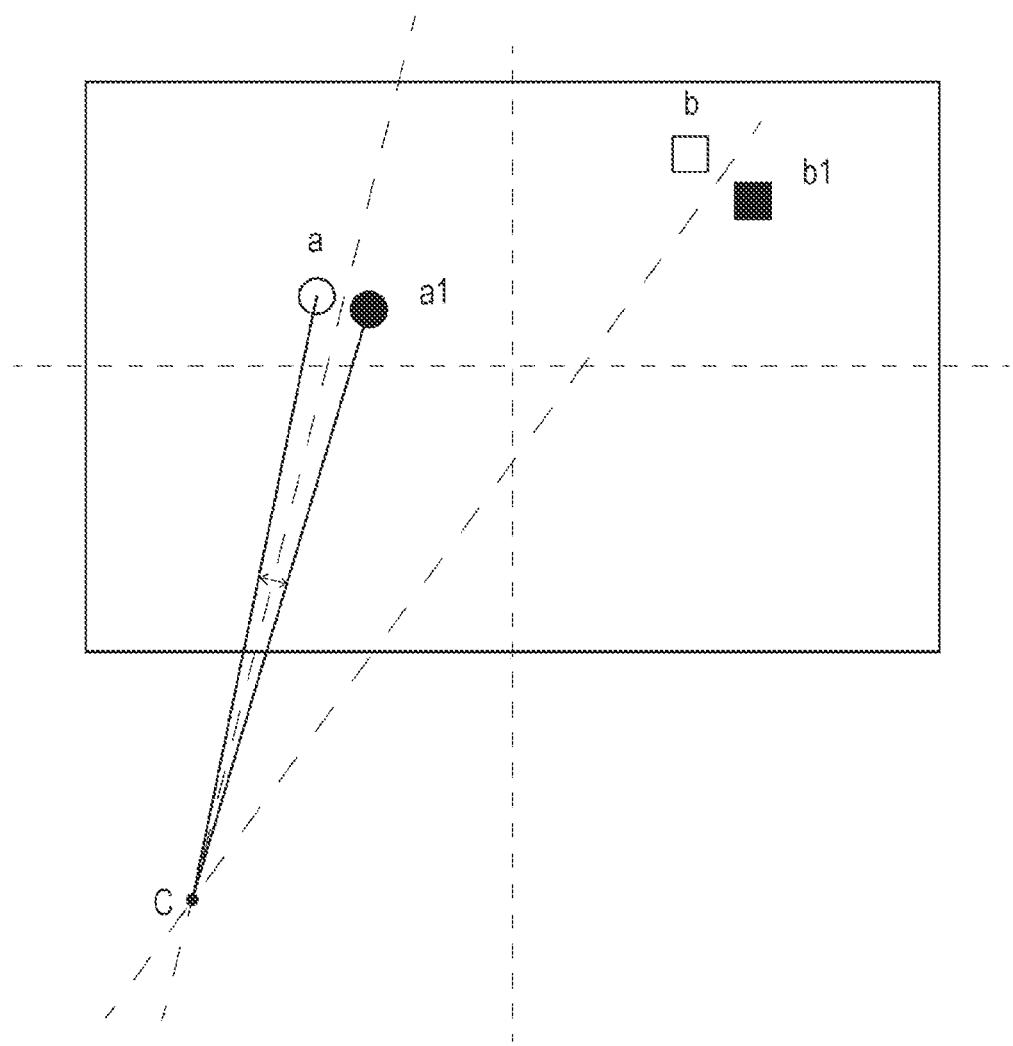
FIG. 3 is a view for explaining the calculation of an inclination angle in the embodiment.

As illustrated in FIG. 3, a point of intersection of the perpendicular bisector of a line connecting the points a and a1 on the coordinate plane of the screen with the perpendicular bisector of a line connecting the points b and b1 is set as a center C. The interior angle of lines each connecting the center C and a corresponding one of the points a and a1 serves as an inclination angle Ta with the road surface. The center C is outside the image in FIG. 3 but may be represented by coordinates on the plane extended from the image. In this embodiment, to reduce an error, the interior angle of lines each connecting the center C and a corresponding one of the points b and b1 is also calculated and is set as an inclination angle Tb, and an inclination angle T with the road surface is obtained from (Ta+Tb)/2 for an average between the inclination angles Ta and Tb. The inclination angle T is an inclination angle in the rolling direction of the vehicle 1. An inclination angle in the pitching direction is also obtainable from the coordinates of the center C.

The ECU 2 instructs the optical-axis adjustment device 51 to adjust the direction of one of the headlights 5 to cancel the inclination angle T. For example, if the left part of the vehicle 1 is lower than the right part with respect to the road surface, the optical axis of the headlight 5 in the right part is lowered. This may prevent the inclination of the vehicle 1 from causing light to be emitted to the driver of a vehicle coming in the opposite direction. As described above, in response to inputting the vehicle inclination angle with the road surface to the optical-axis adjustment device 51, an optical-axis control apparatus controls the optical axis of a headlight. The vehicle inclination angle with the road surface is obtained by using the ECU 2 serving as the vehicle posture calculation device. The optical axis with respect to the road surface may thus be directed within a predetermined range.

The inclination angle in the rolling direction or the pitching direction is obtained from the feature points and the calculated reference points of the two respective landmarks in the embodiment, but the inclination angle or the like may be obtained from three or more landmarks. The two or more calculated reference points and the two or more feature points are extracted, and thereby the inclination angle may be obtained quickly and correctly. In addition, the inclination angle T may be determined, for example, in such a manner as to be changed step by step to reduce the displacement of the feature point of one landmark from the calculated reference point obtained from the 3D data or the like. In this case, the calculated reference point is obtained, for example, in the following manner. On the assumption that there is no inclination in the pitching direction, the inclination angle T in the rolling direction is changed step by step. When the feature point is closest to the calculated reference point, the inclination angle T at that time is obtained.

The embodiments of the disclosure have been described in detail with reference to the drawings. The specific configuration is not limited to those in the embodiments. The embodiments include even designing or the like changed without departing from the spirit of the disclosure. The embodiments above may be combined by using the techniques thereof as long as inconsistency or an issue does not particularly arise in, for example, the purposes and configurations thereof.

For example, the amount of inclination of a vehicle is used to control the optical axis of the headlight in the embodiment but may be used for various controls and the like of the vehicle, such as displaying the inclination of the vehicle on the indicator in the vehicle and controlling an active suspension. In addition, the road surface inclination may be calculated from the curvature of a road in the 3D map. In the embodiment, the altitude of the vehicle is acquired from the altitude data in the 3D map based on the latitude and the longitude where the vehicle is located. However, altitude data acquired with a GPS receiver may also be used. Both the altitude data of the 3D map and the altitude data acquired with the GPS receiver may also be used, for example, in such a manner that the pieces of altitude data are averaged.

According to the embodiments of the disclosure, data indicating the inclination of the vehicle may be acquired with a reduced number of dedicated detectors or the like.

The invention claimed is:

1. A vehicle posture calculation device for a vehicle comprising an electronic control unit for the vehicle and a camera configured to capture an image of at least a region in front of the vehicle, the electronic control unit being configured to:
   acquire a position and orientation of the vehicle traveling on a road and a three-dimensional map based information from a global positioning system receiver;
   extract i) a first feature point from a first landmark identified in an image from the camera and ii) a second feature portion from a second landmark identified in the image from the camera, and obtain positions of the first feature point and the second feature point in two-dimensional coordinates set on the image, the first landmark being different from the second landmark;

calculate, based on the position and orientation of the vehicle and the three-dimensional map including positions of the first landmark and the second landmark, a three-dimensional shape of the first landmark, a three-dimensional shape of the second landmark, an altitude of the road, and road surface information of the road, a first reference point corresponding to the first feature point of the first landmark and a second reference point corresponding to the second feature point of the second landmark as if the first landmark and the second landmark were captured by the camera of the vehicle positioned at the position and orientation on the road and aligned parallel to a road surface of the road in a rolling direction and a pitching direction of the vehicle;

obtain positions of the calculated first reference point and the calculated second reference point in the two-dimensional coordinates set on the image; and calculate a vehicle inclination angle relative to the road surface based on displacement, in the two-dimensional coordinates set on the image, between the position of the first feature point and the position of the calculated first reference point and between the position of the second feature point and the position of the calculated second reference point, wherein the vehicle inclination angle comprises a rolling inclination angle in the rolling direction of the vehicle relative to the road surface and a pitching inclination angle in the pitching direction of the vehicle relative to the road surface, and wherein the electronic control unit is further configured to:
  calculate, in the two-dimensional coordinates set on the image, (1) a first perpendicular bisector of a line connecting the first feature point and the first calculated reference point and (2) a second perpendicular bisector of a line connecting the second feature point and the second calculated reference point;
  calculate, in the two-dimensional coordinates set on the image, a point of intersection of the first and second perpendicular bisectors;
  calculate, in the two-dimensional coordinates set on the image, a first interior angle of lines each connecting the point of intersection of the first and second perpendicular bisectors and a corresponding one of the first feature point and the first calculated reference point;
  calculate, in the two-dimensional coordinates set on the image, a second interior angle of lines each connecting the point of intersection of the first and second perpendicular bisectors and a corresponding one of the second feature point and the second calculated reference point;
  determine an average of the first and second interior angles as the rolling inclination angle; and
  calculate the pitching inclination angle based on coordinates of the point of intersection of the first and second perpendicular bisectors.

2. The vehicle posture calculation device according to claim 1, wherein
the electronic control unit extracts the calculated first and second reference points and the first and second feature points.

3. The vehicle posture calculation device according to claim 1, wherein
the three-dimensional map includes altitude data, and
the electronic control unit acquires altitude of the vehicle from the altitude data based on latitude and longitude where the vehicle is located.

4. The vehicle posture calculation device according to claim 2, wherein
the three-dimensional map includes altitude data, and
the electronic control unit acquires altitude of the vehicle from the altitude data based on latitude and longitude where the vehicle is located.

5. The vehicle posture calculation device according to claim 1, wherein
the electronic control unit acquires altitude data regarding the vehicle from the global positioning system receiver.

6. The vehicle posture calculation device according to claim 2, wherein
the electronic control unit acquires altitude data regarding the vehicle from the global positioning system receiver.

7. The vehicle posture calculation device according to claim 1,
wherein the road surface information in the three-dimensional map includes a road surface inclination.

8. The vehicle posture calculation device according to claim 2,
wherein the road surface information in the three-dimensional map includes a road surface inclination.

9. The vehicle posture calculation device according to claim 1,
wherein the road surface information in the three-dimensional map includes a curvature of the road, and
wherein the electronic control unit calculates a road surface inclination based on the curvature of the road.

10. The vehicle posture calculation device according to claim 2,
wherein the road surface information in the three-dimensional map includes a curvature of the road, and
wherein the electronic control unit calculates a road surface inclination based on the curvature of the road.

11. A headlight optical-axis control apparatus comprising:
the vehicle posture calculation device according to claim 1; and
an optical-axis adjustment device configured to adjust an optical axis of a headlight of the vehicle,
wherein the optical-axis adjustment device is configured to, upon receiving the inclination angle of the vehicle relative to the road surface, direct the optical axis with respect to the road surface within a predetermined range by controlling the optical axis of the headlight.

12. A vehicle posture calculation device for a vehicle comprising an electronic control unit for the vehicle and a camera configured to capture an image of at least a region in front of the vehicle, the electronic control unit being configured to:
acquire a position and orientation of the vehicle traveling on a road and a three-dimensional map based information from a global positioning system receiver;
extract i) a first feature point from a first landmark identified in an image from the camera and ii) a second feature portion from a second landmark identified in the image from the camera, and obtain positions of the first feature point and the second feature point in two-dimensional coordinates set on the image, the first landmark being different from the second landmark;
calculate, based on the position and orientation of the vehicle and the three-dimensional map including positions of the first landmark and the second landmark, a three-dimensional shape of the first landmark, a three-dimensional shape of the second landmark, an altitude of the road, and road surface information of the road, a first reference point corresponding to the first feature point of the first landmark and a second reference point corresponding to the second feature point of the second landmark as if the first landmark and the second landmark were captured by the camera of the vehicle positioned at the position and orientation on the road and aligned parallel to a road surface of the road in a rolling direction and a pitching direction of the vehicle; and obtain positions of the calculated first reference point and the calculated second reference point in the two-dimensional coordinates set on the image, wherein the electronic control unit is further configured to:

calculate, in the two-dimensional coordinates set on the image, (1) a first perpendicular bisector of a line connecting the first feature point and the first calculated reference point and (2) a second perpendicular bisector of a line connecting the second feature point and the second calculated reference point;

calculate, in the two-dimensional coordinates set on the image, a point of intersection of the first and second perpendicular bisectors;

calculate, in the two-dimensional coordinates set on the image, a first interior angle of lines each connecting the point of intersection of the first and second perpendicular bisectors and a corresponding one of the first feature point and the first calculated reference point;

calculate, in the two-dimensional coordinates set on the image, a second interior angle of lines each connecting the point of intersection of the first and second perpendicular bisectors and a corresponding one of the second feature point and the second calculated reference point;

determine an average of the first and second interior angles as a rolling inclination angle; and calculate a pitching inclination angle based on coordinates of the point of intersection of the first and second perpendicular bisectors; and calculate a vehicle inclination angle based on the rolling inclination angle and the pitching inclination angle.

13. The vehicle posture calculation device according to claim 12, wherein the electronic control unit is further configured to:

determine the uppermost portion of the first landmark in the image as the first feature point; and determine the uppermost portion of the second landmark in the image as the second feature point.

14. The vehicle posture calculation device according to claim 12, wherein the road surface information in the three-dimensional map includes a road surface inclination.

15. The vehicle posture calculation device according to claim 12, wherein the road surface information in the three-dimensional map includes a curvature of the road, and wherein the electronic control unit calculates a road surface inclination based on the curvature of the road.

16. The vehicle posture calculation device according to claim 12, wherein the vehicle inclination angle is calculated based on i) the rolling inclination angle in the rolling direction of the vehicle relative to the road surface and ii) the pitching inclination angle in the pitching direction of the vehicle relative to the road surface, and wherein the calculated vehicle inclination angle is relative to the road surface based on displacement, in the two-dimensional coordinates set on the image, between the position of the first feature point and the position of the calculated first reference point and between the position of the second feature point and the position of the calculated second reference point.

* * * * *